US009378195B2

(12) United States Patent
Bernelas et al.

(10) Patent No.: US 9,378,195 B2
(45) Date of Patent: Jun. 28, 2016

(54) LOGICAL CONTINGENCY ANALYSIS FOR DOMAIN-SPECIFIC LANGUAGES

(71) Applicant: International Business Machines Corporation, Armonk, NY (US)

(72) Inventors: Jean Michel Bernelas, Valbonne (FR); Ulrich Junker, Biot (FR); Thierry Kormann, Valbonne (FR); Stephane Mery, Roquefort les Pins (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 292 days.

(21) Appl. No.: 13/967,610

(22) Filed: Aug. 15, 2013

(65) Prior Publication Data
US 2014/0059417 A1 Feb. 27, 2014

(51) Int. Cl.
*G06F 9/44* (2006.01)
*G06F 9/45* (2006.01)
*G06F 17/24* (2006.01)
*G06N 5/00* (2006.01)

(52) U.S. Cl.
CPC .............. *G06F 17/241* (2013.01); *G06F 8/436* (2013.01); *G06N 5/00* (2013.01)

(58) Field of Classification Search
USPC ........................................................ 717/126
See application file for complete search history.

(56) References Cited

U.S. PATENT DOCUMENTS

| 8,073,801 B1 | 12/2011 | von Halle et al. |
| 2003/0182102 A1* | 9/2003 | Corston-Oliver ... G06F 17/2881 704/9 |
| 2004/0237074 A1* | 11/2004 | Aronson ............... G06F 8/4434 717/158 |
| 2009/0319499 A1* | 12/2009 | Meijer et al. ...................... 707/4 |
| 2010/0083233 A1* | 4/2010 | Vanoverberghe et al. .... 717/126 |

(Continued)

OTHER PUBLICATIONS

Baader, et al., "The Description Logic Handbook: Theory, implementation, and applications";, 2nd Edition, Cambridge University Press 2 2007; 59 pages. ISBN:9780521150118.

(Continued)

*Primary Examiner* — Marina Lee
(74) *Attorney, Agent, or Firm* — Cantor Colburn LLP; Jinesh Patel

(57) ABSTRACT

Embodiments relate to validating logical statements in code for domain specific languages. An aspect includes parsing logical statements and annotating constraint type logical statements with specific constraint annotations from the logical grammar of the domain specific language. A non-contradiction graph is built using specific constraint annotations constrained to represent cases satisfying the logical statements and is solved to find a case that satisfies the logical statement or prove that no such case exists, thus locating a contradiction. The non-contradiction graph is negated to form a non-tautology graph constrained to represent cases violating the logical statements and the non-tautology graph is solved to find a case that violates the logical statement or prove that no such case exists, thus locating a tautology. A report is provided regarding at least one case satisfying the logical statement and at least one case violating the logical statement whereby the logical statement is validated.

16 Claims, 11 Drawing Sheets

(56) References Cited

U.S. PATENT DOCUMENTS

| | | | |
|---|---|---|---|
| 2010/0088666 A1* | 4/2010 | Box et al. | 717/104 |
| 2010/0088679 A1 | 4/2010 | Langworthy et al. | |
| 2010/0088686 A1 | 4/2010 | Langworthy et al. | |
| 2010/0169234 A1 | 7/2010 | Metzger et al. | |
| 2010/0192129 A1* | 7/2010 | Langworthy et al. | 717/126 |
| 2011/0119654 A1 | 5/2011 | Miller et al. | |
| 2011/0246972 A1 | 10/2011 | Andrade et al. | |
| 2012/0158628 A1* | 6/2012 | Junker | G06F 19/00 706/14 |
| 2013/0031526 A1* | 1/2013 | Bernelas et al. | 717/100 |
| 2013/0031529 A1* | 1/2013 | Bernelas | G06F 8/31 717/114 |
| 2013/0138473 A1* | 5/2013 | Balko | G06Q 10/04 705/7.27 |
| 2014/0059417 A1* | 2/2014 | Bernelas et al. | 715/230 |

OTHER PUBLICATIONS

Ebbinghaus, et al, "Mathematical Logic" Second Edition; Springer 1994; ISVN978-0-387-94258-2.; pp. 1-13.

Fuchs, Controlled Natural Language, LNCS 5972, Springer, 2010 ISBN: 978-3-642-31174-1; pp. 1-7.

Guerra, et al, "Automated Verification of Model Transformations Based on Visual Contracts" URL: http://www.springerlink.com/content/3148306274n05335/; pp. 1-42.

Kolovos, "An Extensible Platform for Specification of Integrated Languages for MoDel Managment", URL:http://scholar.googleusercontent.com/scholar?q=cache:hF_ZD94_vrgJ:scholar.google.com/+%E2%80%9Cdomain+specific+language%E2%80%9D+detecting+contradictions+semantic+primitives&hl=en&as_sdt=0,5&as_ylo=2008; pp. 1-359.

* cited by examiner

File reader: Context Free Grammar

*syntax concept => "a" defining : symbol ;*

*syntax this_concept => "this" defining : symbol ;*

*syntax excluded <?> variable => that : this_concept ;*

*syntax <?> getter => "the" what : symbol "of" that : variable ;*

*phrase boolean is => lhs : object "is" rhs : object ;*

*phrase boolean and => lhs : boolean "and" rhs : boolean ;*

*phrase boolean is_more_than => lhs : number "is" "more" "than" rhs : number ;*

*phrase boolean is_less_than => lhs : number "is" "less" "than" rhs : number ;*

*phrase number minus => lhs : number "-" rhs : number ;*

*syntax derivation => that : concept "is" base : concept ;*

FIG. 3

File Reader: Statements in Language LX

*a job applicant is a person such that*

*the age of this person is less than 30*

*and the experience of this person is more than 15*

*and the location of this person is "Paris"*

*and the age of this person - the experience of this person is more than 18*

FIG. 4

File reader: Semantic grammar annotation 650

*Boolean algebra: disjunction<T>, conjunction<T>, negation<T>*
*Arithmetics: addition<T>, subtraction<T>, multiplication<T>, division<T>, remainder<T>, less-than-equality<T>, greater-than-equality<T>*

FIG. 7

File reader: Context Free Grammar

*syntax concept => "a" defining : symbol ;*

*syntax this_concept => "this" defining : symbol ;*

*syntax excluded <?> variable => that : this_concept ;*

*syntax <?> getter => "the" what : symbol "of" that : variable ;*

*phrase boolean is => lhs : object "is" rhs : object ;*

*phrase boolean and => lhs : boolean "and" rhs : boolean ;*

*phrase boolean is_more_than => lhs : number "is" "more" "than" rhs : number ;*

*phrase boolean is_less_than => lhs : number "is" "less" "than" rhs : number ;*

*phrase number minus => lhs : number "-" rhs : number ;*

*syntax derivation => that : concept "is" base : concept ;*

File reader: Extended Context Free Grammar

*syntax concept => "a" defining : symbol ;*

*syntax this_concept => "this" defining : symbol ;*

*syntax excluded <?> variable => that : this_concept ;*

*syntax <?> getter => "the" what : symbol "of" that : variable ;*

*phrase boolean is => lhs : object "is" rhs : object {*
semanticMeaning : equality<object> } ;

*phrase boolean and => lhs : boolean "and" rhs : boolean {*
semanticMeaning : conjunction<boolean> } ;

*phrase boolean is_more_than => lhs : number "is" "more" "than" rhs : number {*
semanticMeaning : greater_than_inequality<number> } ;

*phrase boolean is_less_than => lhs : number "is" "less" "than" rhs : number {*
semanticMeaning : less_than_inequality<number> } ;

*phrase number minus => lhs : number "-" rhs : number {*
semanticMeaning : subtraction<number> } ;

*syntax derivation => that : concept "is" base : concept ;*

FIG. 8

LOGICAL CONTINGENCY ANALYSIS FOR DOMAIN-SPECIFIC LANGUAGES

PRIORITY

This application claims priority to Great Britain Patent Application No. GB 1215019.9, filed Aug. 23, 2012, and all the benefits accruing therefrom under 35 U.S.C. §119, the contents of which in its entirety are herein incorporated by reference.

BACKGROUND

The present disclosure relates generally to logical contingency analysis for domain-specific languages, and more specifically, to logical contingency analysis for arbitrary domain-specific languages including arbitrary grammar.

Business automation relies on an adequate representation of business policies and business domain knowledge. A simple and direct way of acquiring this knowledge includes providing adequate authoring tools that permit an expert of the business domain to directly express the knowledge. These authoring tools provide means for expressing the knowledge in a way that is natural for the expert and sufficiently precise for allowing a treatment of the knowledge by the business automation system.

BRIEF SUMMARY

According to an embodiment, a method for validating a set of logical statements in computer readable code for one of a plurality of domain specific languages is provided. The method includes parsing the logical statements and annotating the constraint type logical statements with specific constraint annotations from the logical grammar associated with the domain specific language. A non-contradiction graph is built using the specific constraint annotations constrained to represent cases satisfying the logical statements. The non-contradiction constraint graph is solved to find a case that satisfies the logical statement or to prove that no such case exists thus locating a contradiction. The non-contradiction graph is then negated to form a non-tautology graph constrained to represent cases violating the logical statements and the non-tautology graph is solved to find a case that violates the logical statement or to prove that no such case exists thus locating a tautology. Accordingly, a report is provided as to whether there is at least one case that satisfies the logical statement and at least one case that violates the logical statement whereby the logical statement is validated.

According to another embodiment, a system for validating a logical statement in computer readable code for one of a plurality of domain specific languages is provided. The system includes a parser annotator for parsing constraint type logical statements in a code file and annotating the constraint type logical statements with specific constraint annotations from the logical grammar associated with the domain specific language; a logical modeler for building a non-contradiction graph using the specific constraint annotations constrained to represent cases satisfying the logical statements; a non-contradiction solver for solving the non-contradiction constraint graph to find a case that satisfies the logical statement or to prove that no such case exists thus locating a contradiction; a negation builder for negating the non-contradiction graph to building a non-tautology graph constrained to represent cases violating the logical statements; a non-tautology solver for solving the non-tautology graph to find a case that violates the logical statement or to prove that no such case exists thus locating a tautology; and a contingency certifier for providing a report as to whether there is at least one case that satisfies the logical statement and at least one case that violates the logical statement whereby the logical statement is meaningful.

According to a further embodiment, a computer program product for validating a set of logical statements in computer readable code for one of a plurality of domain specific languages is provided. The computer program product includes a storage medium having computer-readable program code embodied thereon, which when executed by a computer processor, causes the computer processor to implement a method. The method includes parsing the logical statements and annotating the constraint type logical statements with specific constraint annotations from the logical grammar associated with the domain specific language. A non-contradiction graph is built using the specific constraint annotations constrained to represent cases satisfying the logical statements. The non-contradiction constraint graph is solved to find a case that satisfies the logical statement or to prove that no such case exists thus locating a contradiction. The non-contradiction graph is then negated to form a non-tautology graph constrained to represent cases violating the logical statements and the non-tautology graph is solved to find a case that violates the logical statement or to prove that no such case exists thus locating a tautology. Accordingly, a report is provided as to whether there is at least one case that satisfies the logical statement and at least one case that violates the logical statement whereby the logical statement is validated.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Various embodiments will now be described, by way of example only, with reference to the following drawings in which:

FIG. 3 an embodiment of a file reader window diagram displaying an example of a context-free grammar file;

FIG. 4 is an embodiment of a file reader window diagram displaying an example of code statements in a domain specific language LX;

FIG. 7 is an embodiment of a file reader window diagram displaying an example semantic grammar annotation file;

FIG. 8 is an embodiment of a comparison diagram of file reader windows displaying example a context-free grammar and an extended context-free grammar;

DETAILED DESCRIPTION

Figure 1:
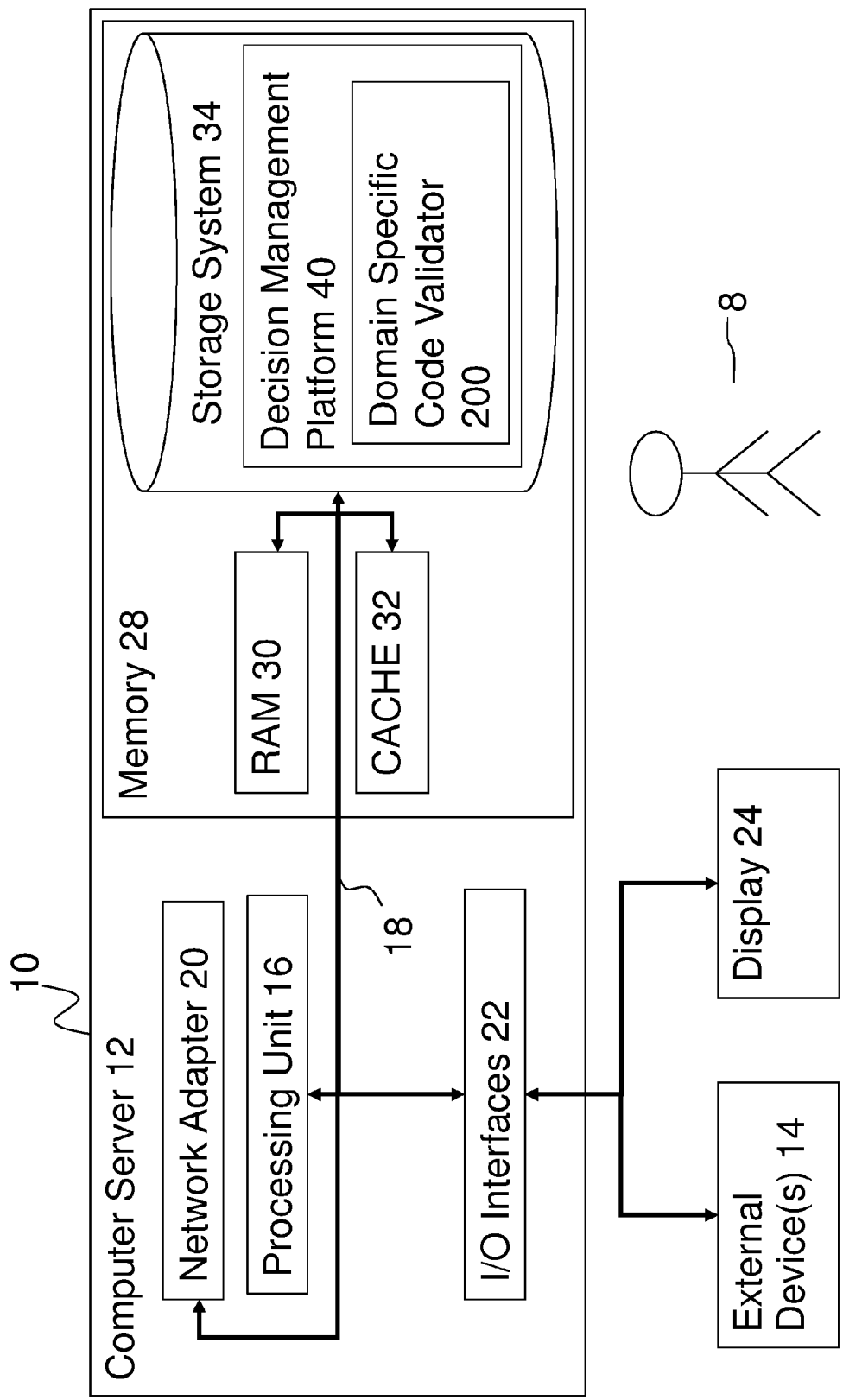
FIG. 1 is an embodiment of a deployment diagram of a domain specific language validator in a decision management platform.

Embodiments disclosed herein validate a set of logical statements in computer readable code for one of a plurality of domain specific languages. An aspect includes parsing the logical statements and annotating the constraint type logical statements with specific constraint annotations from the logical grammar associated with the domain specific language. A non-contradiction graph is built using the specific constraint annotations constrained to represent cases satisfying the logical statements. The non-contradiction constraint graph is solved to find a case that satisfies the logical statement or to prove that no such case exists thus locating a contradiction. The non-contradiction graph is then negated to form a non-tautology graph constrained to represent cases violating the logical statements and the non-tautology graph is solved to find a case that violates the logical statement or to prove that no such case exists thus locating a tautology. Accordingly, a report is provided as to whether there is at least one case that satisfies the logical statement and at least one case that violates the logical statement whereby the logical statement is validated.

Business automation relies on an adequate representation of business policies and business domain knowledge. A simple and direct way of acquiring this knowledge includes providing adequate authoring tools that permit an expert of the business domain to directly express the knowledge. These authoring tools provide means for expressing the knowledge in a way that is natural for the expert and sufficiently precise for allowing a treatment of the knowledge by the business automation system.

One conventional approach includes constructing a controlled natural language (CNL) or domain specific language (DSL) by restricting syntax and semantics of a natural language. Restriction of syntax means that sentences have a particular form and use only terms from a given vocabulary. Restricting the semantics means that the terms are given a pre-chosen sense which is valid in the considered business domain. For example, conceptual ontological models expressed in an ontological description language may be used to define the pre-established semantics of a medical domain in form of axioms on concepts.

Whereas this approach is sufficient for communicating business knowledge, it does not provide the link between the controlled natural language and the internal representation used by the business automation system for processing its task. This internal representation may use an internal knowledge representation formalism (for example production rules) that permits the execution of predefined tasks. If a business user wants to systemize an existing task of a business automation system by providing new business knowledge, there must be a way to compile this knowledge from the controlled natural language into the internal representation of the business automation system. Hence, a separate compiler is needed that translates terms of the controlled natural language into the knowledge representation language of the business automation system if this internal language is different to the CNL.

An alternative conventional method includes using a domain-specific language (DSL) that can directly be understood by the business automation system and to use a natural-language like syntax to make it business-user friendly. Whereas this second approach may not provide the full flexibility of a controlled natural language, it is easier to implement while addressing similar needs. Business-friendly domain-specific languages permit a business user to write statements in a human-readable, albeit formal and non-ambiguous way. For example, the business automation system IBM WebSphere Operational Decision Management System provides several business-friendly domain-specific languages, namely a business-action language to state condition-action rules, a business-event language, and a business-query language. Those languages use a vocabulary which is a set of symbols having a type signature (or many-sorted signature) and predefined verbalizations. Each of these languages has a context-free grammar. Ambiguity of lexical and syntactical analysis is reduced by the type information of the signatures. If the vocabulary entries and the grammar constructs correspond to primitives used by the business automation system, the result of the lexical and syntactical analysis results into an abstract syntax tree (AST) that can be processed by the business automation system.

Hence, this second approach constitutes a simple way for providing natural means of expression to the domain expert while ensuring a successful translation into machine-understandable data structures. It is indeed sufficient to introduce adequate verbalizations for the internal knowledge representation formalism of the business automation system and to use them to define a context-free grammar of a business-friendly domain specific language. This context-free grammar can then be supplied to a toolkit for business-friendly domain-specific languages, which provides generic parsers, user-guided editors and so on. Existing tool-kits provide those services and thus facilitate the creation of new business-friendly domain-specific languages.

Whereas those toolkits provide the necessary services for lexical and syntactic analysis, they lack the capability to perform a logical analysis of statements expressed in the language and to check whether those statements are contingent, that is, can be true or false. Statements that cannot be true constitute contradictions, that is, they describe impossible situations. Statements that cannot be false constitute tautologies and are redundant. Those kinds of analysis are carried out in systems supporting ontological reasoning, but not for custom domain-specific language as those languages lack information about the logical (and arithmetical) semantics of their constructs.

Domain-specific language are used in various ways for modeling the semantics of a system in the conventional art. None of these approaches, however, uses semantic annotations of a DSL in order to carry out an analysis that determines whether statements written in a DSL are logically contingent, that is, free of contradiction and tautology.

Business automation systems use decision management platforms to provide an adequate representation of business policies and other knowledge of the business domain so that the business automation system can perform a business task within a specific domain. An example of a decision management platform is IBM WebSphere Operational Decision Management (formerly called JRules) which makes decisions by applying rules to given cases. In order to fulfill this task, the business automation system requires a representation of the rules in an internal machine-understandable language. A simple and direct way to acquire those rules consists in providing adequate authoring tools to business experts. Those tools enable a business expert to write down the rule in an external human-readable language. As the external and internal rule representation languages thus address different needs, namely human-readable and machine-understandable, there will necessarily be a gap between both representations. For example, if the external rule representation language is a controlled natural language and the internal language is a Java-like rule language, then a sophisticated translator is needed which translates statements from the controlled natural language to Java instructions. A simpler, albeit less flexible approach consists in introducing a domain-specific language, which has an external syntax and an internal representation. The external syntax can mimic expressions of a natural language and is thus readable for the business experts. Internally, the expressions of the domain-specific languages are represented by an abstract syntax-tree which can mimic Java statements and thus easily be translated into machine-understandable code.

IBM and WebSphere are trademarks of International Business Machines Corporation in the US and/or other countries. Java is a trademark of Oracle Corporation in the US and/or other countries.

An exemplary embodiment is described in terms of a validator for domain specific language code as deployed in a decision management platform but the principles of the embodiments can be used for validating any computer readable code on many types of development or execution or management platform.

Referring to FIG. 1, a computer processing system 10 deploying a decision management platform 40 of an embodiment is operational with numerous other general purpose or special purpose computing system environments or configurations. Examples, of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer processing system 10 may be described in the general context of computer system-executable instructions, such as program modules, being executed by a computer system. Generally, program modules may include routines, programs, objects, components, logic, data structures, and so on that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices. As shown in FIG. 1, computer processing system 10 is shown in the form of a general-purpose computing server 12. The components of computer server 12 may include, but are not limited to, one or more processors or processing units 16, a memory 28, and a bus 18 that couples various system components including memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer processing system 10 typically includes a variety of computer system readable media. Such media may be any available media that is accessible by computer processing system 10, and it includes both volatile and non-volatile media, removable and non-removable media.

Memory 28 includes computer system readable media in the form of volatile memory, such as random access memory (RAM) 30 and cache memory 32, and in the form of non-volatile or persistent storage 34. Computer processing system 10 may further include other removable/non-removable, volatile/non-volatile computer system storage media. By way of example only, storage 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of various embodiments.

A set of program modules, including decision management platform 40, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Domain specific language validator 200, a program module that is part of decision management platform 40, is provided to carry out the functions and/or methodologies of embodiments as described herein.

Computer processing system 10 may also communicate with one or more external devices 14 including display 24 via I/O interface 22. External devices can include a keyboard, a pointing device, a printer, a scanner and any external input or output device. Still yet, computer processing system 10 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer processing system 10. Examples, include, but are not limited to: microcode, device drivers, redundant processing units, external disk drive arrays, RAID systems, tape drives, and data archival storage systems.

Figure 2:
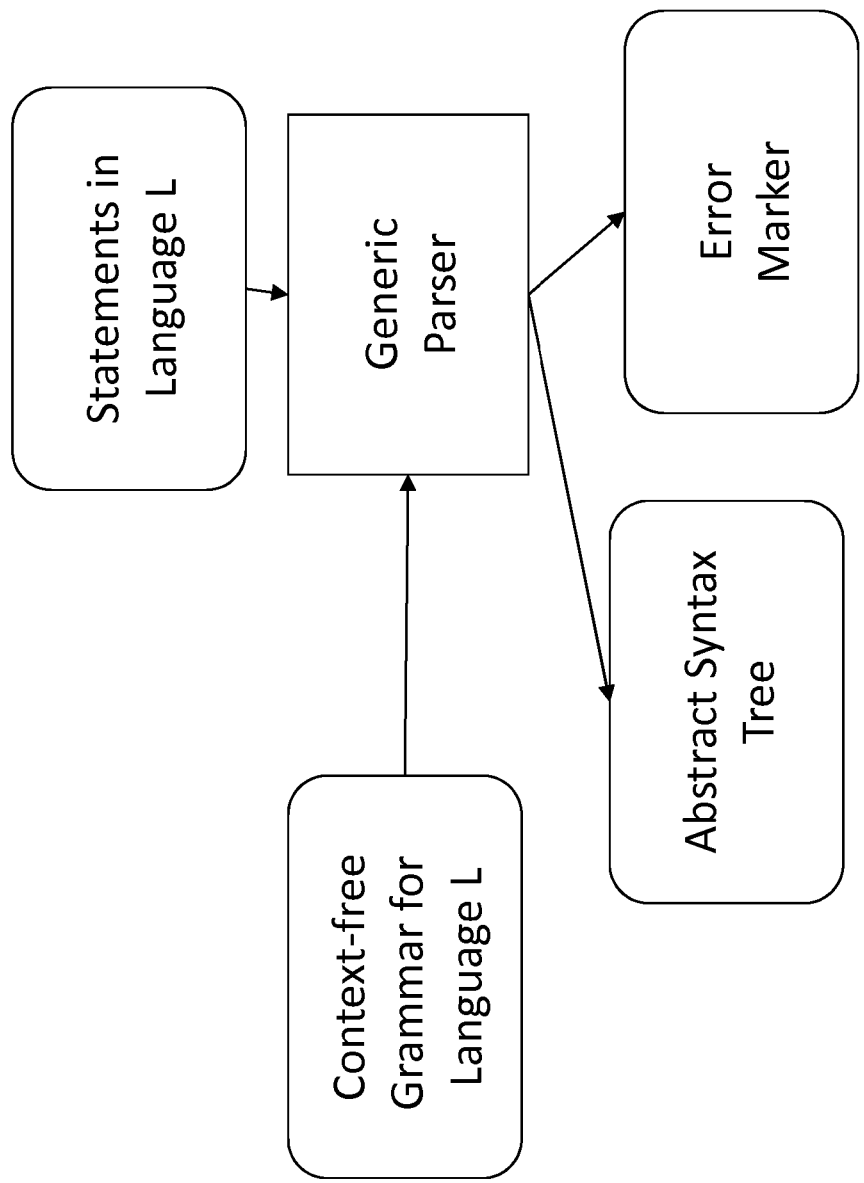
FIG. 2 is an example of a dataflow diagram of a prior art generic parser.

Referring to FIG. 2, generic parser is a component of a prior art validator. Code statements in language L, and a context free grammar for language L, flow into the generic parser. Generic parser data flow comprises: an abstract syntax tree and an error marker. The generic parser creates an internal representation of the grammar constructs and uses this representation to perform a lexical and syntactic analysis of a statement written in language L. The generic parser returns an abstract syntax tree of the statement and reports lexical and syntactical errors found during the analysis. If no error has been found, the resulting abstract syntax tree is syntactically well-formed, contains only symbols of the language, and respects the type signature of those symbols. For example, when supplied with the grammar description of the language L and the defining condition of the job applicant, the generic parser will produce the abstract syntax tree given in FIG. 5.

WebSphere Operational Decision Management provides three domain-specific languages, namely a business-action language to express condition-action rules, a business query language to express powerful queries about rule properties and rule behavior and a business event language to describe events and activities over time. Each of these domain-specific languages is specified by a context-free grammar, which consists of fixed grammar constructs and custom expressions provided by a vocabulary.

Referring to FIG. 3, an example grammar defines a simple domain-specific language LX, which is used to illustrate various embodiments. It is written in a notation used by an internal toolkit for defining domain-specific languages. The root symbol of the grammar is the symbol 'derivation' at the end of the grammar example.

```
syntax concept => "a" defining : symbol ;
syntax this_concept => "this" defining : symbol ;
syntax excluded <?> variable => that : this_concept ;
syntax <?> getter => "the" what : symbol "of" that : variable ;
phrase boolean is => lhs : object "is" rhs : object ;
phrase boolean and => lhs : boolean "and" rhs : boolean ;
phrase boolean is_more_than => lhs : number "is" "more" "than" rhs : number ;
phrase boolean is_less_than => lhs : number "is" "less" "than" rhs : number ;
phrase number minus => lhs : number "–" rhs : number ;
syntax derivation => that : concept "is" base : concept ;
```

This grammar permits a business expert to define simple concepts. Those concepts constitute knowledge about the business domain. For example, it may be useful to introduce the concept of a job applicant for a system that checks whether given online applications meet the requirements of a job description.

Referring to FIG. 4, an example set of code statements defines a job applicant in terms of conditions on the age, experience, and location of a candidate. It can be expressed in the example language LX:

```
a job applicant is a person such that
   the age of this person is less than 30
   and the experience of this person is more than 15
   and the location of this person is "Paris"
   and the age of this person – the experience of this person is more
   than 18
```

This definition consists of a new concept, namely a 'job applicant', an existing concept, namely 'person', and a condition which defines when an instance of the existing concept is an instance of the new concept and when it is not.

Figure 5:
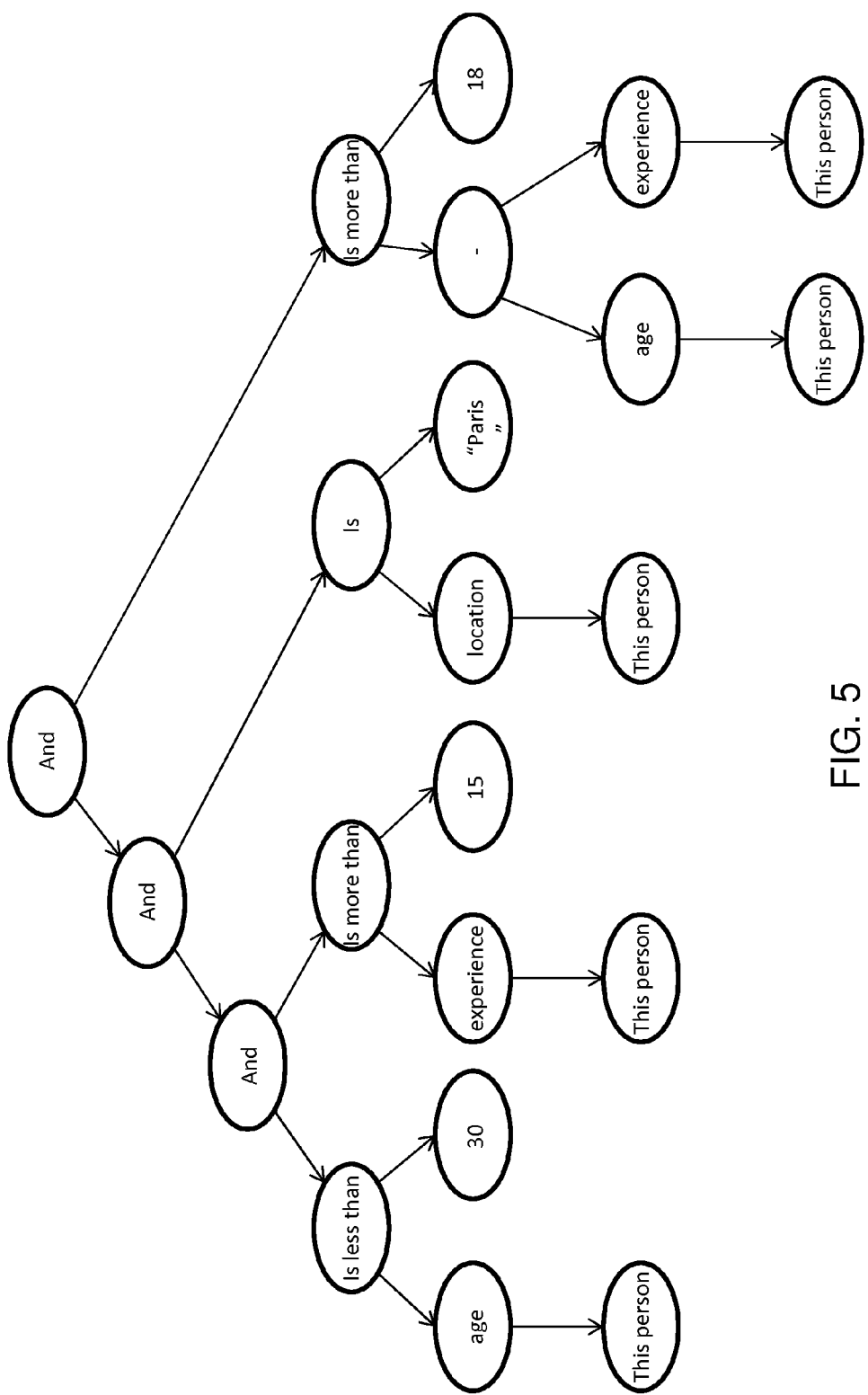
FIG. 5 is an example prior art abstract syntax tree graph produced by the parser of FIG. 2.

Referring to FIG. 5, the output abstract syntax tree 300 represents the structure of the code statements in form of operators and operands. The abstract syntax tree could be compiled into Java code, that when executed, checks whether a given instance of a Java class named 'Person' satisfies the given definition of a job applicant. However, there is no instance that satisfies this particular definition if symbols such as "is less than" and "is more than" are interpreted as less-than inequality and greater-than inequality and the minus symbol is interpreted as subtraction. Given those interpretations of the symbols, it appears that the definition is contradictory. The problem with validating this statement is that the statement could be any one of a plurality of languages and use any one of a plurality of mathematical theories.

A context-free grammar describes the concrete syntax of a language. Parsing statements based on a context-free grammar results into a concrete syntax tree. The leaf nodes of this tree are terminal symbols and its inner nodes are non-terminal symbol. For example, the following grammar rule says that the non-terminal symbol 'sum' may be replaced by a sequence of three symbols, namely a non-terminal symbol 'number', the terminal symbol "+", and the non-terminal symbol 'number' sum→number "+" number

When parsing the expression statement "4+3", the parser constructs a concrete syntax tree consisting of a root node for the non-terminal symbol 'sum' and three leaf nodes, namely one for the terminal symbol "4", another one for the terminal symbol "+", and a third one for the terminal symbol "3". Hence, the concrete syntax tree directly corresponds to the application of the given grammar rule.

However, such a concrete syntax tree is not convenient for further processing such as code generation or logical analysis. Modern parsers therefore generate abstract syntax trees that describe a language expression in form of operators and operands. The expression "4+3" consists of a plus-operation with two operands, namely 4 and 3. The abstract syntax tree captures this information. It consists of a root node labeled with the plus-operation and two child nodes for the operators 4 and 3.

This example shows that abstract syntax trees cannot directly be derived from a context-free grammar, but need to be constructed based on specific instructions. Attribute grammars permit the computation of attributes during parsing. These computations are achieved by augmenting the grammar rules with formulas for computing those attributes. Those formulas refer to the specific occurrences of grammar symbols of the right-hand-side of the grammar rule. The occurrences can be distinguished by indices or labels. In some embodiments, the occurrences of grammar symbols are tagged by labels. For example, the label 'left' will be used to tag the left operand of the sum and the label 'right' will be used for the right operand of the sum. The labels precede the occurrence of the grammar symbol and both are separated by a colon. Given such a grammar rule sum→left: number "+" right: number it can be augmented by computing the value of the sum-node based on the value of the child nodes:

sum.value=left.value+right.value

Similarly, there can be an attribute 'ast' that represents the abstract syntax tree of the node. The internal DSL toolkit uses a generic method for this which constructs an AST node by supplying the name of the non-terminal symbol of the left-hand side of the grammar rule, as well as the ASTs of all the labeled symbols on the right-hand side. In the example, this action would look like:

sum.ast=new Node ("sum", left.ast, right.ast)

This instruction constructs an AST that is labeled with the sum-operation and that has a child for each of the two operands. This generic approach for AST generation works if non-terminal symbols on the left-hand side reflect the name of the considered operation as it is the case for the following grammar rules:

```
is => left: object "is" right: object;
and => left: boolean "and" right: boolean;
is_more_than => left: number "is" "more" "than" right: number;
is_less_than => left: number "is" "less" "than" right: number;
```

However, these grammar rules alone are not sufficient since they do not explain that the non-terminal symbol 'boolean' can be replaced by any of the non-terminal symbols 'is', 'and', 'is_more_than', 'is_less_than'. This can be expressed by the following grammar rules

```
boolean => is
boolean => and
boolean => is_more_than
boolean => is_less_than
```

As those additional rules simply replace a single nonterminal symbol by a single other non-terminal symbol, they do not lead to the creation of new AST nodes, but the ast-attribute of the left-hand sides of those rules is equal to the ast-attribute of their right-hand sides.

The internal DSL toolkit provides a short-hand notation that combines these additional grammar rules with the original rules above. In the example, there are four different rules for the non-terminal symbol 'boolean', which must be distinguished by a particular name. Those rules can be written in the following way where the non-terminal symbol is succeeded by the name of the respective grammar rule.

```
boolean is => left: object "is" right: object;
boolean and => left: boolean "and" right: boolean;
boolean is_more_than => left: number "is" "more" "than" right: number
boolean is_less_than => left: number "is" "less" "than" right: number;
```

Hence, these mixed grammar rules have two symbols on their left-hand side, namely a non-terminal symbol such as 'boolean' which may occur in the right-hand side of grammar rules and a dedicated symbol such as 'is_less_than' that serves as identifier of the grammar rule and that is used as name of the operation when constructing an AST node.

By convention, this grammar can be set up in a way such that the leading non-terminal symbols of a grammar rule represent distinct types. For example, there will be a non-terminal symbol corresponding to a boolean type, another one to a number type, and even other ones to custom object types such as 'Customer'. If this convention is respected rigorously, the parser extracts the type information from these non-terminal symbols and uses it to label the AST nodes by types. In this respect, the usage of two symbols of the left-hand side of a grammar rule resembles standard type declarations in programming languages.

Sometimes a grammar rule may apply to different types. For example, the following rules describe getter expressions for different types, namely numbers, booleans or custom object types:

```
boolean getter => "the" what : symbol "of" that : variable ;
number getter => "the" what : symbol "of" that : variable ;
Customer getter => "the" what : symbol "of" that : variable ;
```

It is more convenient to introduce a wild card symbol <?>, which represents any type, and to write a single grammar rule:
    <?> getter=>"the" what: symbol "of" that: variable;
Any non-terminal symbols can then be replaced by this wild-card type, which could be expressed by the following grammar rules, which are built into the toolkit:

```
boolean => <?>
number => <?>
Customer => <?>
```

Note: there are even other keywords, namely 'excluded', 'phrase', and 'syntax', which represent control information and which are irrelevant for the present disclosure. They can be ignored in the grammar examples.

Figure 6:
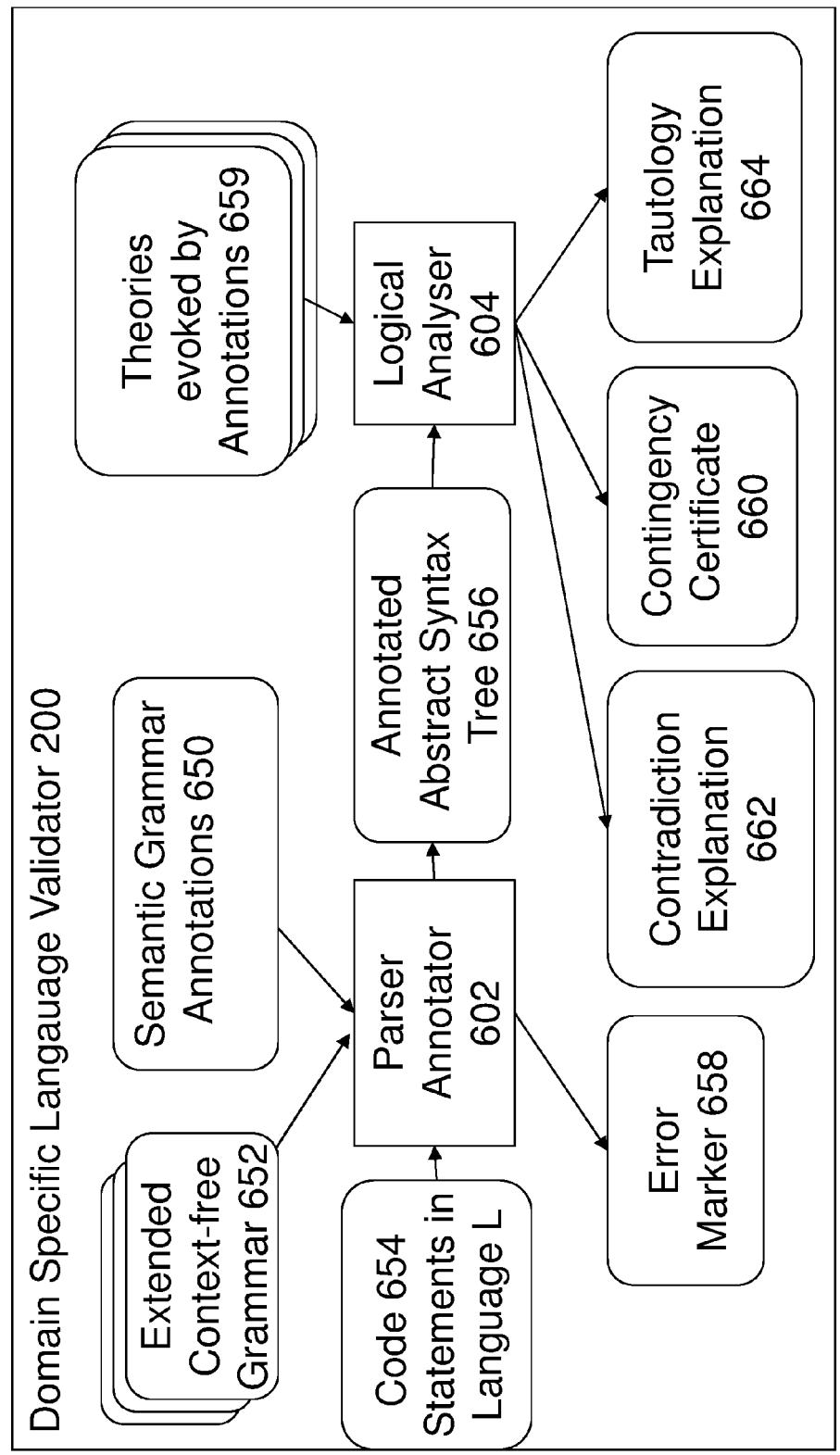
FIG. 6 is an embodiment of a component and dataflow diagram of a validator.

Referring to FIG. 6, a domain specific language validator 200 according to an embodiment comprises: a parser annotator 602 and a logical analyser 604.

Parser annotator 602 is semantically-aware in that it is supplied with semantic grammar annotations 650 in addition to a context free grammar 652 for a domain-specific language and code 654 written in this language. Parser annotator 602 performs a lexical and syntactic analysis of the statement and identifies the semantics of the grammar constructs. It returns an annotated abstract syntax tree 656 of the code 654 or reports lexical and syntactic errors 658. The annotated abstract syntax tree 656 is then passed to logical analyzer 604.

Logical analyzer 604 determines whether code 654 represented by the annotated abstract syntax tree 656 is free of contradiction and tautology. If yes, logical analyzer 604 produces a certificate of contingency 660, which shows that the statement is free of contradiction and tautology. If logical analyzer 604 finds a contradiction it computes a contradiction explanation 662 comprising a minimal subset of nodes of the abstract syntax tree that are necessary to obtain the contradiction. Similarly, if logical analyzer 604 finds a tautology it computes a tautology explanation 664 comprising a minimal subset of nodes of the abstract syntax tree that are necessary to obtain the tautology. Logical analyzer 604 is described in more detail below with respect to FIG. 9.

Semantic grammar annotations 650 is a dictionary of semantic primitives that evoke the mathematical operations of given mathematical theories such as: arithmetics, Boolean algebra, order theory, set algebra and so on. For each of these mathematical theories, there exists a specialized constraint solver that checks the satisfiability or unsatisfiability of constraints. It is possible to couple those solvers in order to do these checks for combinations of theories. The embodiments combine domain specific languages with constraint solvers that are specialized for a given mathematical theory. The embodiments suppose that the operations of those theories are declared as semantic primitives in semantic grammar annotations 650. Each mathematical theory refers to a type and the operations are defined over this type.

Referring to FIG. 7, semantic grammar annotations 650 comprises a text file and may contain the following entries:

```
Boolean algebra: disjunction<T>, conjunction<T>, negation<T>
Arithmetics: addition<T>, subtraction<T>, multiplication<T>,
division<T>,
remainder<T>, less-than-equality<T>, greater-than-equality<T>
```

Each set of operations satisfy the axioms of the corresponding mathematical theory. For example, for Boolean algebra, conjunction, disjunction, and negation satisfy De Morgan's law. It is not necessary to specify these axioms separately. They are chosen implicitly by evoking the notions of well-established theories.

Referring to FIG. 8, extended context-free grammar 652 is shown adjacent the prior art context-free grammar. The bold underlined text (below and in FIG. 8) represents the extensions that are added to the context-free grammar to render the extended context-free grammar. Embodiments extend the context-free grammar declarations of a domain-specific language by semantic annotations that occur in the dictionary of semantic primitives.

```
syntax concept => "a" defining : symbol ;
syntax this_concept => "this" defining : symbol ;
syntax excluded <?> variable => that : this_concept ;
```

-continued

```
syntax <?> getter => "the" what : symbol "of" that : variable ;
phrase boolean is => lhs : object "is" rhs : object {
    semanticMeaning : equality<object> };
phrase boolean and => lhs : boolean "and" rhs : boolean {
    semanticMeaning : conjunction<boolean>};
phrase boolean is__more__than => lhs : number "is" "more" "than" rhs :
number {
    semanticMeaning : greater than inequality<number>};
phrase boolean is__less__than => lhs : number "is" "less" "than" rhs :
number {
    semanticMeaning : less than inequality<number> };
phrase number minus => lhs : number "–" rhs : number {
    semanticMeaning : subtraction<number> };
syntax derivation => that : concept "is" base : concept ;
```

For example, the grammar construct '< . . . > is more than < . . . >' denotes a greater-than inequality for the type 'Number' and therefore receives the semantic annotation 'greater-than inequality<T>'. The semantic annotation consists of the name of the operation in the semantic dictionary and the type T to which it is applied. The mathematical theory (that is arithmetics, Boolean algebra and so on) need not be referenced in the semantic annotation. It is determined by the name of the operation. For example, the operation 'Addition' refers to arithmetics and there should be only one addition operation, that is, one kind of arithmetics for a given type in the standard usage of the semantic annotations.

In case, there are multiple instances of a given mathematical theory for a given type, then those instances need to be named explicitly. For example, it may be possible to introduce two different arithmetic theories A1 and A2 for a given number type T. Then it must be stated that A1 and A2 are both arithmetic theories for type T and the name of the arithmetics must be specified in the semantic annotation. For example, one grammar construct may be annotated by 'addition<A1>' and another grammar construct may be annotated by 'addition<A2>'.

Figure 9:
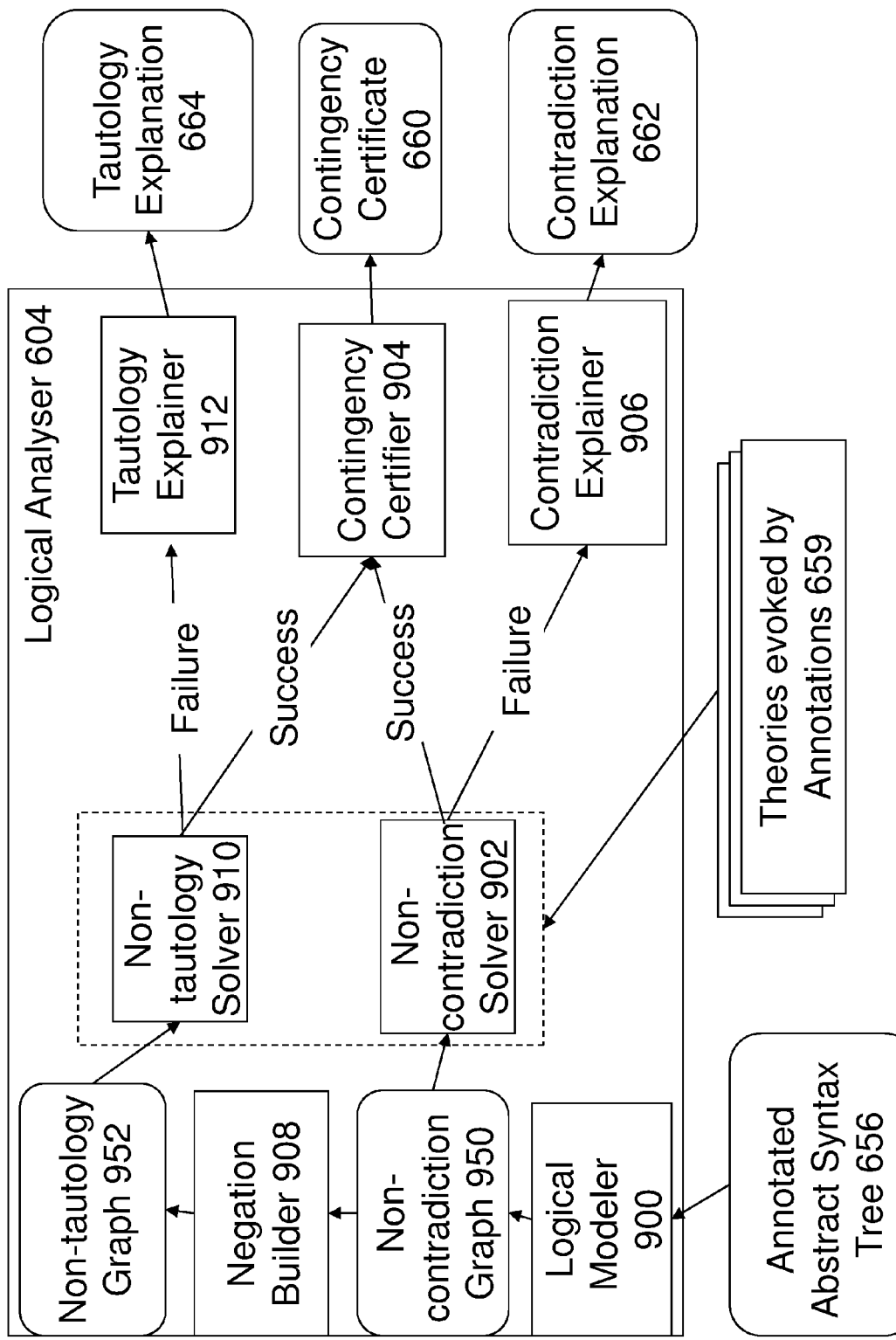
FIG. 9 is an embodiment of a component and dataflow diagram of the logical analyzer.

Referring to FIG. 9, logical analyzer 604 comprises the following components: logical modeler 900; non-contradiction solver 902; contingency certifier 904; contradiction explainer 906; negation builder 908; non-tautology solver 910; and tautology explainer 912. Logical analyzer 604 comprises the following internal data structures: non-contradiction graph 950 and non-tautology graph 952.

Logical modeler 900 is for building a constraint graph, non-contradiction graph 950, an expression of a logical problem constrained in such a way to find a contradiction. Logical analyzer 604 takes annotated syntax tree 656 as input and checks it for contradictions and tautology. FIG. 9 shows dataflow within logic analyzer 604. In a first block, the annotated abstract syntax tree 656 is submitted to logical modeler 900 for building a non-contradiction graph 650. Each node of the annotated abstract syntax tree 656 is mapped to a node of the non-contradiction graph 650. The leaf nodes of the non-contradiction graph 650 are labeled by the values and by the constants occurring in the annotated abstract syntax tree 656. The inner nodes of the non-contradiction graph 950 are labeled by the mathematical operations referenced in the annotated abstract syntax tree 656. If an inner node in the annotated abstract syntax tree 656 has no associated operation, then logical modeler 900 will treat it as an uninterpreted but named function. The logical modeler 900 therefore labels the corresponding node in the non-contradiction graph 650 by the name of this function as it occurs in the annotated abstract syntax tree 656. The nodes of the non-contradiction graph 650 thus represent the expressions that are described by the annotated abstract syntax tree 656 while imposing the principle of unique representations. If two nodes in the annotated abstract syntax tree 656 have the same labels and are roots of identical branches, then those nodes are represented only once in the non-contradiction graph. This unique representation of nodes is important for the solving process.

Non-contradiction solver 902 is for solving the non-contradiction graph to find a case that satisfies the logical statements represented by the AST or to prove that there is no such case, which means that the AST expresses a contradiction. Non-contradiction solver 902 is a general constraint solver adapted to use one or more specialized constraint solvers for any mathematical theory evoked in the non-contradiction graph. Specialized constraint solvers include: satisfiability (SAT) solvers, constraint programming solvers (SATs), and integer programming solvers.

Contingency certifier 904 is for certifying that the graphs have no contradiction and no tautology and therefore that the concept is a meaningful one.

Contradiction explainer 906 is for identifying a minimal subset of statements that are necessary to obtain a contradiction. If non-contradiction solver 902 does not find valid then labeling it invokes contradiction explainer 906. Contradiction explainer 906 determines a minimal set of nodes in the non-contradiction graph that are sufficient to produce the contradiction. In a first block the contradiction explainer 906 brings the non-contradiction graph 950 into negation normal form. This block pushes the negation operations down the graph by applying de Morgan's laws. For example, the negation of a disjunction is transformed into a conjunction of negations. The result is a non-contradiction graph 950 in negation normal form. Contradiction explainer 906 then extracts all elementary conjuncts from the non-contradiction graph in negation normal form. These are all the upper-most nodes in this graph that do not represent conjunctions. If the root node of the non-contradiction graph 950 in negation normal form is not a conjunction then contradiction explainer 906 is not able to refine the contradiction and will simply return this root node. Otherwise it will compute a minimal unsatisfiable subset of the set of elementary conjuncts. For example, a consistency-based explanation algorithm can be used for this purpose. A consistency-based explanation algorithm is described in the article "Explanation in Product Configuration" by Haag, Junker, and O'Sullivan. The consistency-based algorithm described in this article is called QuickXplain and is the subject of other publications.

Negation builder 908 is for building a non-tautology graph 952 from non-contradiction graph 950.

Non-tautology solver 910 is for solving non-tautology graph 952. If the graph is successfully solved, thereby indicating a case that violates the logical statements represented by the AST, then contingency certifier 904 is called. If non-tautology graph 952 is not solved then the AST cannot be made false, thereby indicating a tautology. In this situation, tautology explainer 912 is called.

Tautology explainer 912 is for reporting, as tautology explanation 664, those statements that together form a tautology.

Figure 10:
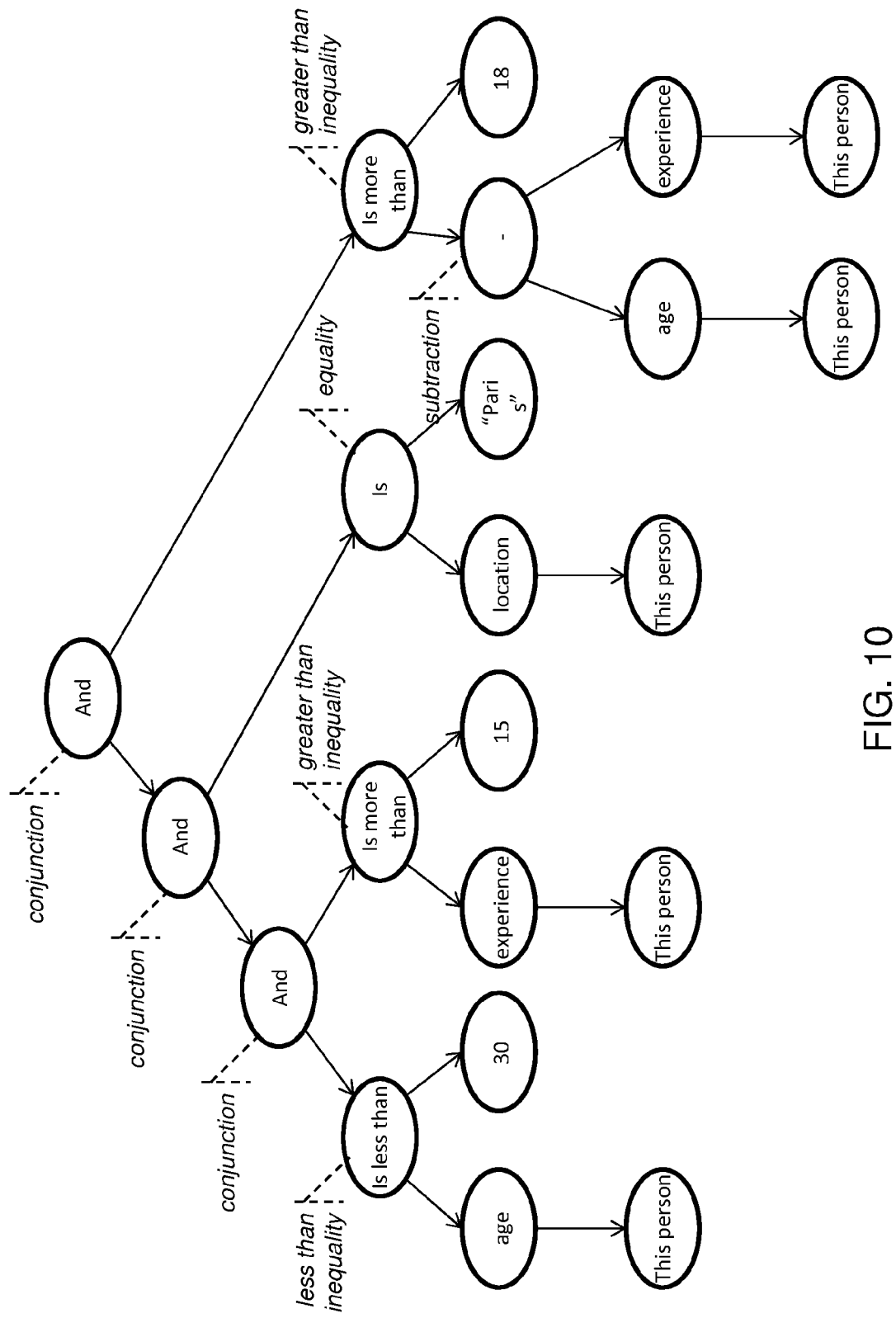
FIG. 10 is an embodiment of an annotated abstract syntax tree graph.

Referring to FIG. 10, an example annotated abstract syntax tree 656 defines conditions for a concept 'Job Applicant'. Compared to the abstract syntax tree of FIG. 5, it has node labels corresponding to operations from semantic grammar annotations 650. Logical analyzer 604 uses these labels to evoke specialized solvers that are able to solve constraints involving these operations.

Figure 11:
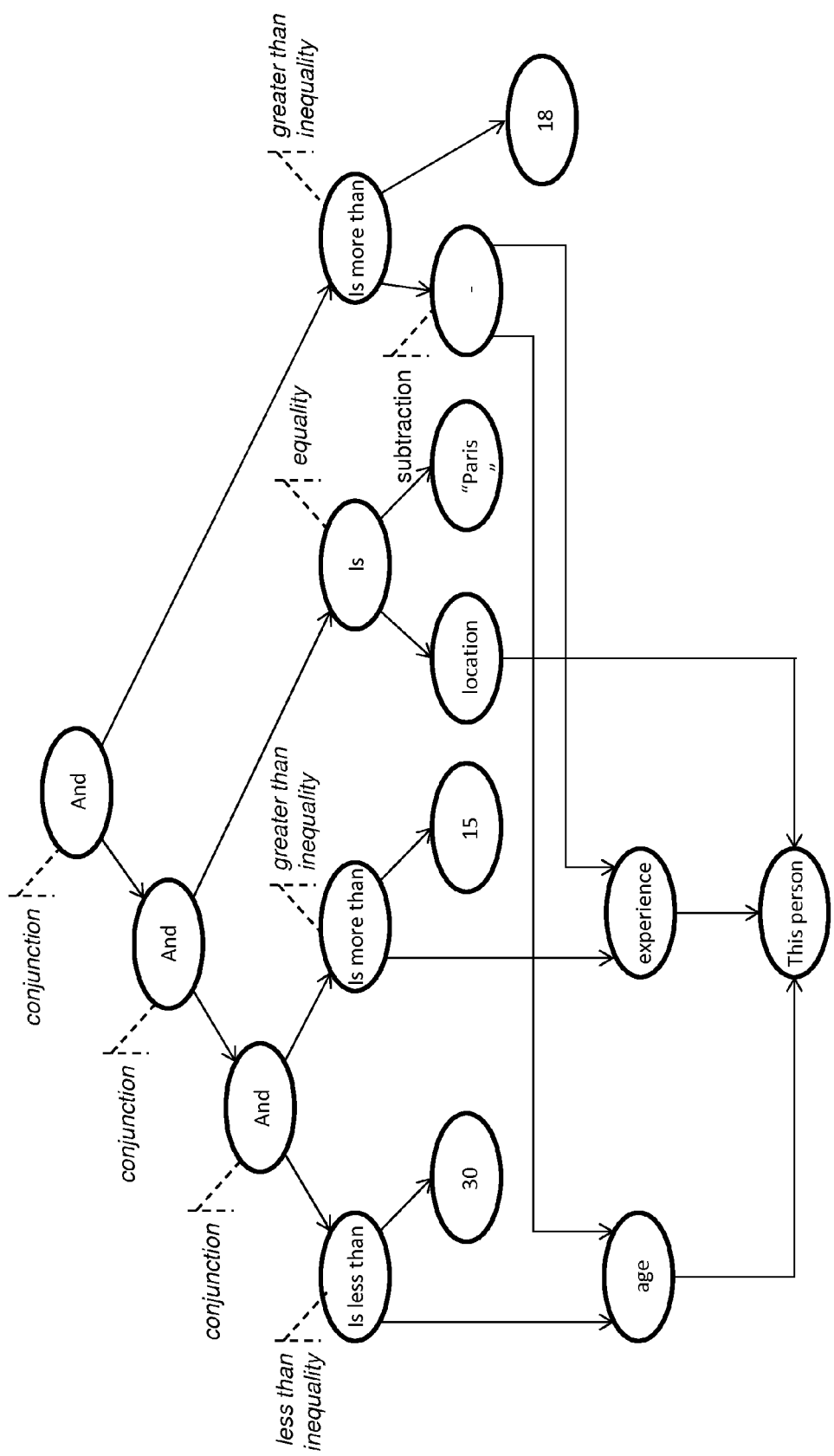
FIG. 11 is an embodiment of a constraint graph of annotated abstract syntax tree of FIG. 10.

Referring to FIG. 11, an example non-contradiction graph 910 for the defining condition of a 'Job Applicant' is described. It can be seen that equivalent nodes in FIG. 10 annotated abstract syntax tree 656 have been consolidated into a unique node in FIG. 11's non-contradiction graph as is required by a constraint graph. Non-contradiction graph 910 describes all cases that satisfy this defining condition in a compact and implicit form. A particular case can be determined by labeling the nodes of the non-contradiction graph with values such that the operations of the graph nodes are respected and the root node of the non-contradiction graph is ultimately labeled by true by extrapolating the values back through the logic branches to the root. Vice versa, any such valid labeling of the non-contradiction graph corresponds to a case that satisfies the defining condition. If a non-contradiction graph has such a valid labeling, then the defining condition represented by the graph is free of contradiction. However, if the graph has no valid labeling then the defining condition is contradictory and therefore impossible to satisfy.

For example, the non-contradiction graph in FIG. 11 has no valid labeling that satisfies all operations of the graph nodes and that labels the root node with true. Logical analyser 604 uses non-contradiction solver 902 to show this. Non-contradiction solver 902 shows the unsatisfiability of non-contradiction graph 950 in the following way: as the root node is a conjunction its children must be labeled with true in order to label the root node with true. If such a child is again a conjunction, the children of such a child must be labeled with true. Hence, the node "the age of this person is less than 30" must be labeled with true. As a consequence, the node "the age of this person" must be labeled with a value smaller than 30. Furthermore, the node "the experience of this person is more than 15" must be labeled with true. As a consequence, the node "the experience of this person" must be labeled with a value greater than 15. The node representing the subtraction of the age of the person and his number of years of experience is greater than 18 must also be true. Now, as the age is less than 30 and the number of years of experience is greater than 15, the difference between both cannot be greater than 18. Hence, non-contradiction graph 950 has no valid labeling. As a consequence, the defining condition of the concept 'Job Applicant' is contradictory, meaning that this concept has no instance.

Contradiction explainer 906 finds a minimal explanation containing the following elementary conjuncts:

1. the age of this person is less than 30
2. the experience of this person is more than 15
3. the age of this person—the experience of this person is more than 18

These conjuncts are contradictory, that is, there is not any case that satisfies them all. However, if any conjunct is removed then the resulting subset of conjuncts is free of contradiction. It is important to note that the explainer has removed the following conjunct as it does not contribute to the contradiction:

4. the location of this person is "Paris"

Logical analyzer 604 returns the explanation of contradiction. A business expert can then use this information when reviewing the definition of the concept 'Job Applicant' and modify it based on the explanation. For example, the business user may drop the constraint on the age:

--- a job applicant is a person such that
    the experience of this person is more than 15
    and the location of this person is "Paris"
and the age of this person − the experience of this person is more than 18

---

If the defining condition of this new definition is passed to the logical analyzer 604, it will now find a labeling of non-contradiction graph 950 of the new defining condition that labels the root node by true and that satisfies all operations of the graph nodes. For example, the non-contradiction solver 902 may label the number of years of experience of this person by 16 and the age of this person by 35. This labeling of the non-contradiction graph 950 thus characterizes a case that satisfies the defining condition. This certifies that the defining condition is free of contradiction.

Logical analyzer 604 now checks whether the defining condition is free of tautology. For this purpose, it builds non-tautology graph 952, which is satisfied by a case if and only if this case violates non-contradiction graph 950. Hence, the non-tautology graph can be obtained from the non-contradiction graph by applying the logical negation. If non-tautology graph 952 has a valid labeling, which respects the operations of all graph nodes and labels the root node with true, then the non-contradiction graph 950 has a labeling that respects the operations of all graph nodes and labels the root node with false. Such a labeling thus characterizes a case that violates the defining condition. The logical analyzer 604 passes the non-tautology graph 952 to non-tautology solver 910. If the non-tautology solver 910 finds a valid labeling of non-tautology graph 952, then it has shown that the defining condition is free of tautology, that is, it is possible to find cases that violate it. For example, a labeling that sets the experience to 14 and the age to 35 violates the condition of the modified definition and there is at least one case that does not satisfy the condition.

Logical analyzer 604 will then produce a certificate of contingency consisting of a case that satisfies the defining condition and another case that violates the defining condition. This certificate shows that the defining condition is free of contradiction and tautology. It also shows that any definition of a concept based on this condition may have positive and negative instances.

The following definition uses a condition which is a tautology:

--- a job applicant is a person such that
    the experience of this person is more than 15
    or the location of this person is "Paris"
    or the experience of this person is less than 20

---

Non-tautology solver 910 will not find any labeling of the non-tautology graph that respects the graph operations and that labels the root node with true. Indeed, in order to label the root node with true, it must label the node "the experience of this person is more than 15" with false. It must also label the node "the experience of this person is less than 20" with false. Hence, the person must have at most 15 years of experience and at least 20 years of experience. As this is not possible, the defining condition of this third example is a tautology.

Tautology explainer 912 works as the contradiction explainer 906. It first brings the non-tautology graph in negation normal form, extracts the elementary conjuncts of the resulting graph, and computes a minimal unsatisfiable subset of the set of elementary conjuncts. In the considered example, the explanation will list:

1. it is not true that the experience of this person is more than 15
2. it is not true that the experience of this person is less than 20

Logical analyzer 604 returns this explanation, thus allowing the business expert to modify the definition in order to make it free of tautology.

In general, a condition may involve several contradictions and tautologies. This can be addressed by an interactive approach repeating the logical analysis and modification of the definitions by the business expert.

Embodiments disclosed herein act on logical statements written in an arbitrary domain-specific language such as the defining condition of a concept and the applicability condition of a rule. The method is not limited to business rules or business decision management but can be applied to many other systems that use logical statements to form rules.

The embodiments disclose a method and system for logical analysis of statements written in an arbitrary domains specific language (DSL). A common idea of the embodiments consists in attaching semantic annotations to the grammar constructs and the vocabulary of a DSL. An example is an annotation of the following grammar construct between quotations: '< . . . > is more than < . . . >'; this constructs denotes a strict total order. The semantic annotations refer to elementary mathematical notions such as the notion of a total order, the notion of an inverse relation, the operations of a Boolean algebra and the operations of arithmetics. The embodiments check whether the statements written in a given DSL are logically consistent (free of contradiction) or logically contingent (free of contradiction and tautology) with respect to the given semantics. The embodiments use one or a combination of specialized solvers for the mathematical theories evoked by the semantic annotations.

In particular, the embodiments are capable of analyzing definitions of new concepts written in the DSL. An example is the definition of an eligible customer of an insurance company who must meet a certain number of conditions on age, health, and debt records. A concept is only meaningful if it has at least one positive example, that is, a case that satisfies the condition, and one negative example, that is, a case that violates the condition. The embodiments check whether a concept definition written in the DSL is free of contradiction and tautology and thus has positive and negative examples. The embodiments are able to detect statements and concept definitions that are meaningless and are able to compute explanations that allow the author to address those issues. The explanations can, for example, be visualized by highlighting the parts of the definition that are in contradiction (or that lead to a tautology). The embodiments leverage modern consistency-based explanation methods that ensure minimal explanations. Hence, only relevant parts of a definition will be highlighted, thus allowing a treatment of more complex expressions.

The embodiments comprise an augmented toolkit for business-friendly domain-specific languages with logical analysis services that are triggered by the existing parsing and user-guided editing services of the toolkit. The logical analysis services uses a pool of specialized constraint solvers for mathematical theories such as arithmetics, Boolean algebra, order theory, set algebra, equality theory. Each of these theories is characterized by a set, operations over this set, and axioms satisfied by the operations. For example, Boolean algebra consists of three operations called disjunction, conjunction, and negation. Arithmetics consist of several operations, namely addition, subtraction, multiplication, remainder, greater-than inequality and so on. As the operations and axioms of such mathematical theories are fixed, a specialized solver can thus exploit particular properties of the theory and use dedicated data structures when solving constraints and thus be more efficient than a general theorem prover which works with an arbitrary set of axioms. The disclosed system uses a dictionary of semantic primitives which lists all the operations supported by the specialized solvers. The author of a domain-specific language can then annotate the grammar constructs of this language by the operations registered in this dictionary. This way of providing semantic annotations is simpler than writing axioms in a logical formalism and thus facilitates the task of attaching at least an elementary semantics to a DSL.

It will be clear to one of ordinary skill in the art that all or part of the method of various embodiments may suitably and usefully be embodied in additional logic apparatus or additional logic apparatuses, comprising logic elements arranged to perform the method and that such logic elements may comprise additional hardware components, firmware components or a combination thereof.

It will be equally clear to one of skill in the art that some or all of the functional components of various embodiments may suitably be embodied in alternative logic apparatus or apparatuses comprising logic elements to perform equivalent functionality using an equivalent method, and that such logic elements may comprise components such as logic gates in, for example a programmable logic array or application-specific integrated circuit. Such logic elements may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

Various embodiments may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infra-red, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Various embodiments may be realized in the form of a computer implemented method of deploying a service comprising the blocks of deploying computer program code operable to, when deployed into a computer infrastructure and executed thereon, cause the computer system to perform all the blocks of the method.

Various embodiments may be realized in the form of a data carrier having functional data thereon, said functional data comprising functional computer data structures to, when loaded into a computer system and operated upon thereby, enable said computer system to perform all the blocks of the method.

It will be clear to one skilled in the art that many improvements and modifications can be made to the foregoing exemplary embodiment without departing from the scope of the present invention.

What is claimed is:

1. A method for validating a set of logical statements in computer readable code for one of a plurality of domain specific languages, comprising:
   parsing the logical statements and annotating the logical statements with specific constraint annotations associated with the domain specific language;
   building a non-contradiction graph using the specific constraint annotations constrained to represent cases satisfying the logical statements;
   solving the non-contradiction graph to find a case that satisfies the logical statement or to prove that no such case exists thus locating a contradiction;
   negating the non-contradiction graph to form a non-tautology graph constrained to represent cases violating the logical statements;
   solving the non-tautology graph to find a case that violates the logical statement or to prove that no such case exists thus locating a tautology; and
   providing a report as to whether there is at least one case that satisfies the logical statement and at least one case that violates the logical statement whereby the logical statement is validated.

2. A method according to claim 1 further comprising, if a contradiction is located, identifying a minimal subset of statements that are necessary to obtain a contradiction.

3. A method according to claim 1 further comprising, if a tautology is located, identifying a minimal subset of statements that are necessary to obtain a tautology.

4. A method according to claim 1 wherein solving comprising using a general theory solver utilizing a combination of specialized solvers for the mathematical theories wherein the type of solver needed is defined by the annotations.

5. A method according to claim 4 wherein specialized solvers are one or more of: an arithmetic solver; a Boolean algebra solver; an order theory solver; a set algebra solver; and/or an equality theory solver.

6. A method according to claim 1 further comprising producing a certificate of contingency that includes a case free of contradiction and tautology, or producing a certificate of contingency that includes a case with contradiction and tautology.

7. A computer program product for validating a logical statement in computer readable code for one of a plurality of domain specific languages, the computer program product comprising:
   a non-transitory computer readable storage medium having program code embodied therewith, the program code executable by a processor for:
   parsing the logical statements and annotating the logical statements with specific constraint annotations associated with the domain specific language;
   building a non-contradiction graph using the specific constraint annotations constrained to represent cases satisfying the logical statements;
   solving the non-contradiction graph to find a case that satisfies the logical statement or to prove that no such case exists thus locating a contradiction;
   negating the non-contradiction graph to form a non-tautology graph constrained to represent cases violating the logical statements;
   solving the non-tautology graph to find a case that violates the logical statement or to prove that no such case exists thus locating a tautology; and
   providing a report as to whether there is at least one case that satisfies the logical statement and at least one case that violates the logical statement whereby the logical statement is validated.

8. A computer program product according to claim 7 further comprising, if a contradiction is located, identifying a minimal subset of statements that are necessary to obtain a contradiction.

9. A computer program product according to claim 7 further comprising, if a tautology is located, identifying a minimal subset of statements that are necessary to obtain a tautology.

10. A computer program product according to claim 7 wherein solving comprising using a general theory solver utilizing a combination of specialized solvers for the mathematical theories wherein the type of solver needed is defined by the annotations.

11. A computer program product according to claim 10 wherein specialized solvers are one or more of: an arithmetic solver; a Boolean algebra solver; an order theory solver; a set algebra solver; and/or an equality theory solver.

12. A computer program product according to claim 7 further comprising, producing a certificate of contingency that includes a case free of contradiction and tautology, or producing a certificate of contingency that includes a case with contradiction and tautology.

13. A method for validating a set of logical statements in computer readable code for one of a plurality of domain specific languages, comprising:
   parsing the logical statements and annotating the logical statements with specific constraint annotations associated with the domain specific language;
   building a first graph using the specific constraint annotations to represent cases satisfying the logical statements;
   solving the first graph to find a case that satisfies the logical statement or to prove that no such case exists thus locating a contradiction;
   negating, where the first graph is valid, the first graph to form a second graph to represent cases violating the logical statements;
   solving the second graph to find a case that violates the logical statement or to prove that no such case exists thus locating a tautology; and
   providing a report as to whether there is at least one case that satisfies the logical statement and at least one case that violates the logical statement whereby the logical statement is validated.

14. A method according to claim 13 further comprising, if a contradiction is located, identifying a minimal subset of statements that are necessary to obtain a contradiction.

15. A method according to claim 13 further comprising, if a tautology is located, identifying a minimal subset of statements that are necessary to obtain a tautology.

16. A method according to claim 13 further comprising, producing a certificate of contingency that includes a case free of contradiction and tautology, or producing a certificate of contingency that includes a case with contradiction and tautology.

\* \* \* \* \*